July 11, 1933.  W. L. FORREST  1,917,962
AUXILIARY CHASSIS FOR AUTOMOBILES
Filed Oct. 15, 1930  3 Sheets-Sheet 1
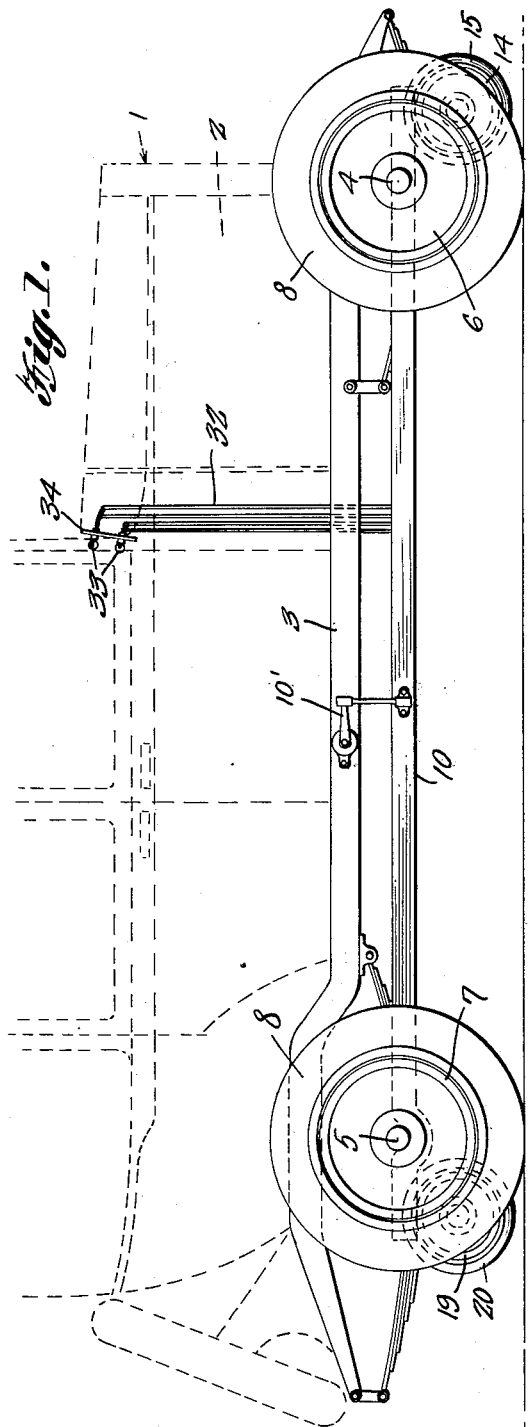
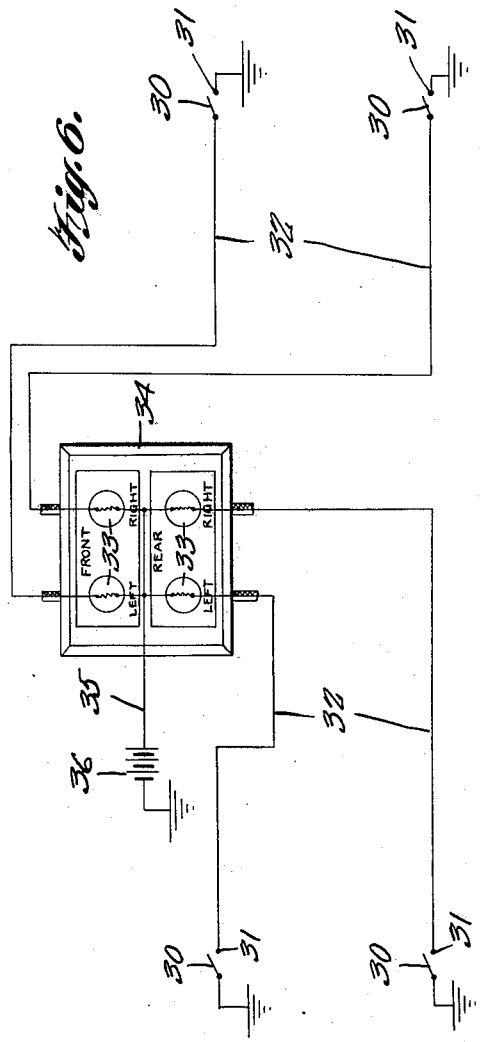
Waverly L. Forrest,
INVENTOR
BY Victor J. Evans
ATTORNEY

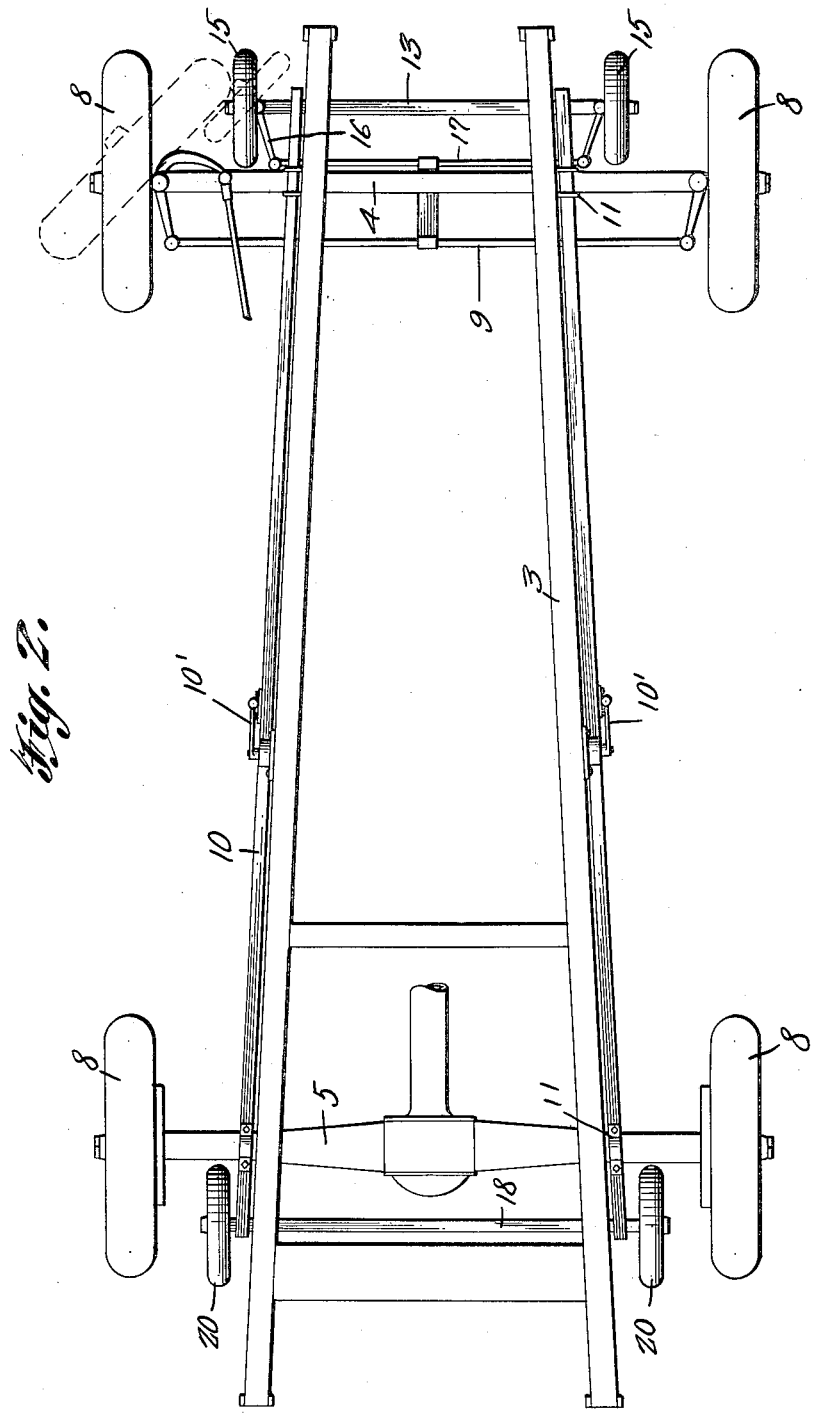

July 11, 1933. W. L. FORREST 1,917,962
AUXILIARY CHASSIS FOR AUTOMOBILES
Filed Oct. 15, 1930 3 Sheets-Sheet 3
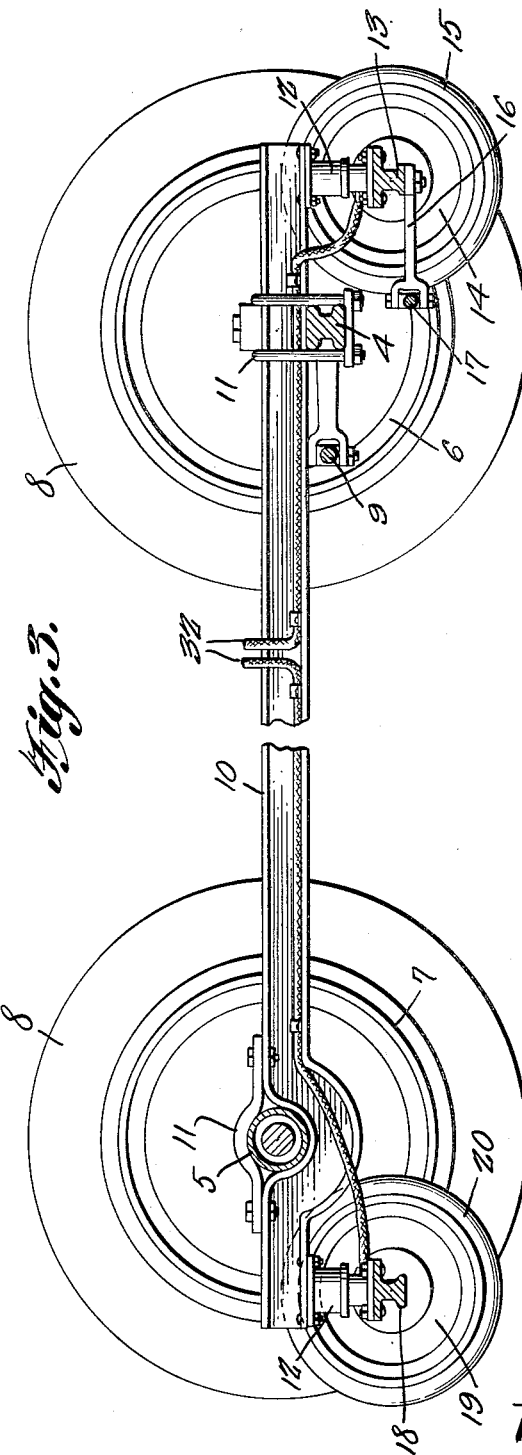
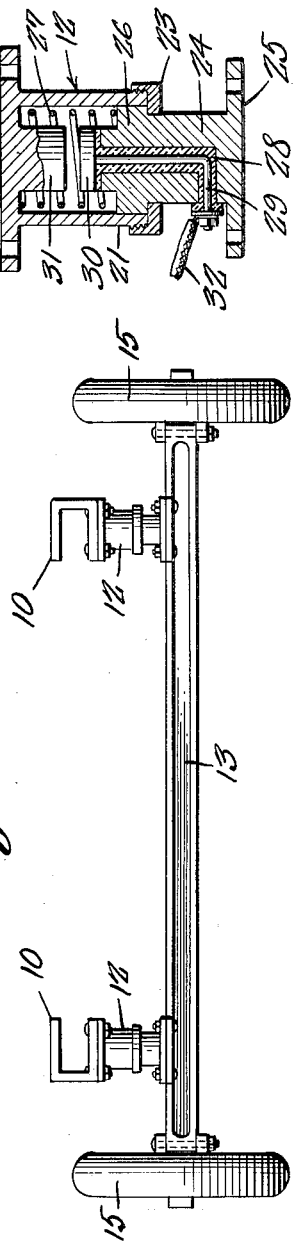

Patented July 11, 1933

1,917,962

UNITED STATES PATENT OFFICE

WAVERLY LEE FORREST, OF DARE, VIRGINIA

AUXILIARY CHASSIS FOR AUTOMOBILES

Application filed October 15, 1930. Serial No. 488,940.

This invention relates to an auxiliary chassis for automobiles and similar motor vehicles and has for the primary object, the provision of a device of the above stated character for assuming the weight of the automobile or vehicle when either of the tires, wheels or axles thereof are disabled for any reasons, preventing severe tilting of the vehicle and accidents that may be caused thereby and further permit the vehicle to be moved easily to a distant point for repair from the scene of the accident.

Another object of this invention is the provision of means whereby the vehicle may be steered by the usual steering mechanism while supported by the auxiliary device.

A further object of this invention is the provision of a signal to indicate immediately to the driver which wheel or tire of the vehicle is disabled.

A still further object of this invention is the provision of an auxiliary chassis for automobiles of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which:

Figure 1 is a side elevation illustrating an auxiliary chassis for automobiles and showing the same attached to a vehicle.

Figure 2 is a top plan view of the device showing the same attached to the main chassis of the vehicle.

Figure 3 is a longitudinal sectional view illustrating the same.

Figure 4 is a front elevation illustrating the front end of the auxiliary chassis.

Figure 5 is a detail sectional view illustrating the connection between the auxiliary axle and the auxiliary frame of the device.

Figure 6 is a diagrammatic view illustrating the wiring diagram for the signal.

Referring in detail to the drawings, the numeral 1 indicates a motor vehicle of a conventional type consisting of a body 2 mounted upon the main frame 3 carrying the front and rear axles 4 and 5 respectively and on which are mounted the front and rear wheels 6 and 7 having the usual pneumatic tires 8. The front wheels are of the customary steering type connected to the steering mechanism of the vehicle and the front wheels are connected in the usual way by the transverse rod 9. The foregoing description relates to a well known construction of vehicle to which my invention is applied.

An auxiliary frame 10 is detachably secured to the front and rear axles 4 and 5 by suitable clamps 11 and by referring to Figure 3 it will be seen that the frame 10 extends above the front axle 4 while the frame adjacent the rear end is provided with a seat in which is received the rear axle 5 and the latter is retained therein by the clamps. Axle attaching members 12 are bolted or otherwise secured to the frame 10 in front and rear of the axles 4 and 5 of the vehicle and said members 12 also provide circuit closing means which will be hereinafter more fully described. A front axle 13 is secured to the front axle attaching members 12 and carries at the ends the usual stub axles on which the front auxiliary wheels 14 are journaled and the latter have mounted thereon tires 15 preferably of the solid type. The stub axles of the auxiliary front axle 13 are provided with the usual arms 16 connected together by a rod 17 which is in turn suitably connected to the rod 9 whereby the movement of the rod 9 occasioned by the steering of the vehicle will cause a corresponding movement of the rod 17 moving the auxiliary wheels in a corresponding direction with the front wheels of the vehicle.

A rear axle 18 is secured to the rear axle attaching members 12 and has mounted thereon the rear wheels 19 carrying tires 20 preferably of the solid type. By referring to Figure 3 it will be seen that the tires 15 and 20 of the auxiliary device are normally out of engagement with the ground when the device is attached to the vehicle. However in case of an accident to any one of the tires, wheels or axles of the vehicle, the corresponding auxiliary wheel and tire will come into engagement with the ground thereby assuming the weight of the vehicle and prevent undue tilting of the vehicle and accidents that may be caused by such movement.

In case of an accident and the auxiliary device assumes the burden of supporting the vehicle, the vehicle then can be moved from one point to another and steered in the usual manner by the front auxiliary wheels 14 which will act as a steering medium.

The axle attaching members 12 are identical in construction and reference to one is specifically thought sufficient for all. It includes a cylindrical member 21 having a base attaching portion 22 at one end and its opposite end closed by a removable cap or element 23 which slidably receives a stem 24 provided at the outer end with an attaching portion 25. A shoulder 26 is formed on the stem 24 and is located within the cylindrical member 21 and engages the cap 23 to limit the outward movement of the stem. A coil spring 27 is interposed between the attaching plate 22 and the shoulder 26 for normally urging the stem outwardly of the cylindrical member 21 and the latter is provided with a passage in which is located an insulating member 28 carrying a conductor 29 which extends through one side of the stem and through the inner end of the latter for connection with a movable contact 30 and the latter moves with the stem to engage a stationary contact 31 located on the attaching portion 22 when the stem is moved inwardly of the cylindrical member 21.

The conductors 29 of the axle attaching members and circuit closers are connected to conductors 32 which are in turn connected to signal lamps 33 located in a suitable panel 34 mounted within the vehicle 1 and preferably upon the instrument board in clear view of the driver. The signal lamps are arranged in groups and have indicia located adjacent thereto for the purpose of indicating the respective wheel or tire of the motor vehicle which is disabled. The signal lamps 33 are connected to a conductor 35 which is in turn connected to a battery or electrical source 36 and the latter is grounded as clearly shown in Figure 6 and it is also to be seen that the members 12 are connected to the ground whereby the movable contact 30 of any one of the members 12 engaging the contact 31 will complete an electric circuit to the respective signal lamp thereby indicating to the driver which wheel or tire of the vehicle 1 is disabled. It is to be understood that as soon as any one of the auxiliary wheels of the device assumes the weight of the vehicle causing the stem of the corresponding member 12 to that wheel to complete the circuit to the proper signal lamp for illumination.

Suitable shock absorbers 10' are located between the main and auxiliary frames, preferably at the sides thereof for the purpose of relieving the strain on the springs of the vehicle and thereby obviating the possibility of the springs becoming broken and further to take care of side motions of the chassis.

While I have shown and described the preferred embodiment of my invention, it will be understood that minor changes in construction, combination and arrangement of parts may be made without departing from the spirit and scope of the invention as claimed.

Having thus described the invention, what I claim is:

An auxiliary chassis for an automobile comprising a frame, means for attaching the same to the axles of a motor vehicle, front and rear axles arranged in spanning relation to said frame, wheels carried by said axles, and means effecting yielding connection between the axles and said frame at opposite sides at opposite ends of the latter, said means each comprising an inverted open-ended cylinder secured to the under side of the frame to depend therefrom, a stem disposed on top of and secured to the axle and having a shouldered portion disposed within the cylinder, the open end of the cylinder being provided with a removable cap having a clearance opening for the passage of said stem, spaced abutting members carried respectively by the cylinder at the closed end and by the stem above the shouldered portion, and an expansion spring disposed in surrounding relation to said members and compressed between the closed end of the cylinder and said shoulder.

In testimony whereof I affix my signature.

WAVERLY LEE FORREST.